United States Patent [19]

Andrews et al.

[11] Patent Number: 4,464,943

[45] Date of Patent: Aug. 14, 1984

[54] SEEKER GYROSCOPE HAVING REDUCED CROSS-COUPLING BETWEEN ROTOR SPIN AND PRECESSION

[75] Inventors: Harold E. Andrews, Simi Valley; Spencer D. Howe, Los Angeles, both of Calif.

[73] Assignee: Hughes Aircraft Company, El Segundo, Calif.

[21] Appl. No.: 388,061

[22] Filed: Jun. 14, 1982

[51] Int. Cl.³ .................... G01C 19/30; G01C 19/06
[52] U.S. Cl. .......................... 74/5.46; 74/5.7
[58] Field of Search ............... 74/5.46, 5.7; 244/3.16

[56] References Cited

U.S. PATENT DOCUMENTS

| | | | |
|---|---|---|---|
| 3,324,733 | 6/1967 | Younkin | 74/5.7 |
| 3,845,995 | 11/1974 | Wehde | 74/5.46 X |
| 3,988,658 | 10/1976 | Meinke et al. | 74/5.46 X |
| 4,093,154 | 6/1979 | McLean | 244/3.16 |
| 4,189,948 | 2/1980 | Buckley et al. | 74/5.46 |
| 4,191,346 | 3/1980 | McLean | 74/5.46 X |
| 4,277,039 | 7/1981 | Blanning et al. | 244/3.16 |

FOREIGN PATENT DOCUMENTS 2522827 12/1976 Fed. Rep. of Germany ....... 74/5.46

Primary Examiner—Rodney H. Bonck
Attorney, Agent, or Firm—Charles D. Brown; A. W. Karambelas

[57] ABSTRACT

A two-axis gyroscope in which precession may be effected by application of a DC current to the stationary precession windings. The rotor assembly has a pair of ring-shaped permanent magnets with their magnetic vectors aligned parallel with the gyro spin axis. This structure presents a magnetic field to the precession windings which does not change as the rotor assembly rotates. Thus the gyroscope may be precessed by application of a DC current to the precession windings. The precession windings are located along two orthogonal axes to allow precession of the gyro in two orthogonal directions.

10 Claims, 5 Drawing Figures

SEEKER GYROSCOPE HAVING REDUCED CROSS-COUPLING BETWEEN ROTOR SPIN AND PRECESSION

BACKGROUND OF THE INVENTION

1. Field of the Invention

This invention relates to the structure of gyroscopes and in particular to the structure of the rotor and windings of a two-axis gyroscope such as the gyroscope of a seeker missile. Specifically the invention concerns effecting very smooth precession of the gyroscope by means of a rotor configuration which permits DC excitation of the precession windings.

2. Description of the Prior Art

A variety of gyroscopically stabilized platforms have been used in target seeker missiles. A gyroscope used in one such target seeking missile is disclosed in U.S. Pat. No. 4,093,154 issued to McLean on June 6, 1978. A copy of that patent is enclosed. As is typical with gyroscopes of the prior art (so far as is known) that gyroscope requires the use of an AC signal to accomplish precession of the gyroscope. The AC signal is required because precession is accomplished by interaction of the current in the precession coil with a magnetic field (produced by magnet 22 of McLean) which changes with rotation of the rotor assembly. Because the direction of precession is determined by the rotational position of the rotor magnet, precession in a given desired direction can only be achieved when the rotor magnet is in a corresponding determinable position. Hence the precession control current is applied only when the rotor magnet reaches the determinable position. Precession is therefore not smooth, but performed in a series of pulsed precessions.

In any gyroscope where precession and spin are accomplished by interaction of the precession control current and the spin control current with the same magnetic field or fields which change as the rotor rotates, cross coupling between spin and precession occurs. This same configuration will also produce a response in the precession axes that is not being commanded. This is commonly known as wobbulation. An AC precession control signal and an AC servo will thus be required to effect precession of the rotating rotor magnet. In the gyroscope disclosed in McLean, gyro spin (motoring) is accomplished by directing compressed gas against vanes on the rotor instead of by an electrical coil and permanent magnet. Thus, the gyroscope disclosed in the McLean patent does not exhibit perturbations in precession due to any electrical current which in other gyroscopes (but not in the McLean gyroscope) controls gyro spin. Nonetheless, since the McLean gyro uses a rotating magnetic field to effect precession, the resulting precession is not as smooth as that effected by the gyro configuration of the instant invention.

In those gyroscopes which accomplish motoring and precession by electrical fields and permanent magnets, cross coupling is a relevant consideration. A certain amount of cross coupling results whenever the motor magnets are also used to effect precession. It is thus a primary objective of the invention to provide a gyroscope platform having minimal cross coupling between the motoring control signal and the resulting gyroscope precession. Minimal cross coupling will result in a very smoothly precessible gyroscope since no precession would result from the AC motoring signal.

In most gyroscopes employing an AC servo to effect precession, the amount of cross coupling (i.e. the effect of the motoring signal on the precession of the gyroscope) is dependent upon the gimbal angles. The greater the angular displacement of the gyroscope from the missile body axes, the greater the cross coupling. If cross coupling could be made independent of the gimbal angles, the gyroscope could withstand greater gimbal angles and still provide acceptable performance and accuracy.

Some examples of known seeker missiles include the Sidewinder Missile seeker, Redeye, Agile (Hughes' Mod 1 and Mod 2) and the Laser Maverick seekers (Rockwell). In each of these, the rotor has a single magnetic axis. Because the magnetic vector changes with respect to the non-rotating torquer (precession) coil with the change in rotor position, an AC servo is required. Since both the motoring coils (which produce gyro spin) and torquing coils (which produce precession) interact with the same rotor magnetic field vector, unwanted magnetic cross coupling is produced. Since the cross coupling increases with increased gimbal angles, this arrangement limits the gyro to relatively small gimbal angles.

SUMMARY OF THE INVENTION

A two-axis gyroscope is used to provide a stable platform for the detector/seeker subsystems of a seeker device such as a missile. The gyroscope is constructed so that the precession coils interact with a magnetic field that does not change with rotation of the rotor assembly. Such a magnetic field is provided by a ring-shaped annular magnet having its center axis coincident with the gyro spin axis. The magnetic field of the ring-shaped magnet is characterized by a magnetic vector oriented parallel to the gyro spin axis. Precession of the gyroscope is accomplished by passing a DC control current through the precession coil. The rotor magnets used to provide gyro spin have their magnetic vectors oriented transverse to the gyro spin axis. Thus, the current passing through the motor coils to drive the gyro is orthogonal to the current required to precess the gyro and cross coupling is substantially eliminated.

DETAILED DESCRIPTION OF THE INVENTION

The rotor and coil assemblies which are the subject of this invention are parts of a two-axis gyroscope used to provide a stable platform for the detector/seeker subsystems of a seeker device such as an air-to-air missile. An understanding of the principles of the operation of such a target seeking missile can be obtained from U.S. Pat. No. 4,093,154 issued June 6, 1978 to McLean. For purposes of the present invention a much abbreviated explanation will suffice. In a typical seeker system, the detector/seeker subsystem is mounted upon a gyroscopically stabilized platform located in the nose of the missile. Energy radiated from the target is detected by the detector/seeker subsystem. If the target is not aligned with the spin axis of the gyroscope, the detector/seeker subsystem generates an output signal. The output signal is processed by electronic circuitry to generate a control current of proper magnitude and polarity which is applied to the gyroscope's precession coils. The current flowing through the precession coils causes the gyroscope to precess in a direction such that the spin axis of the gyroscope tends to become aligned with the target. The same output signal of the detector/seeker subsystem is further processed by control circuitry to generate control signals which drive servomechanisms to move the control surfaces of the missile. As the control surfaces move, the missile will be caused to follow a path determined by the particular control equations to bring the missile to a collision with the target. One such particular control equation is the well known proportional guidance steering method which automatically causes the missile to lead the target and thereby effect an efficient target intercept.

Figure 1:
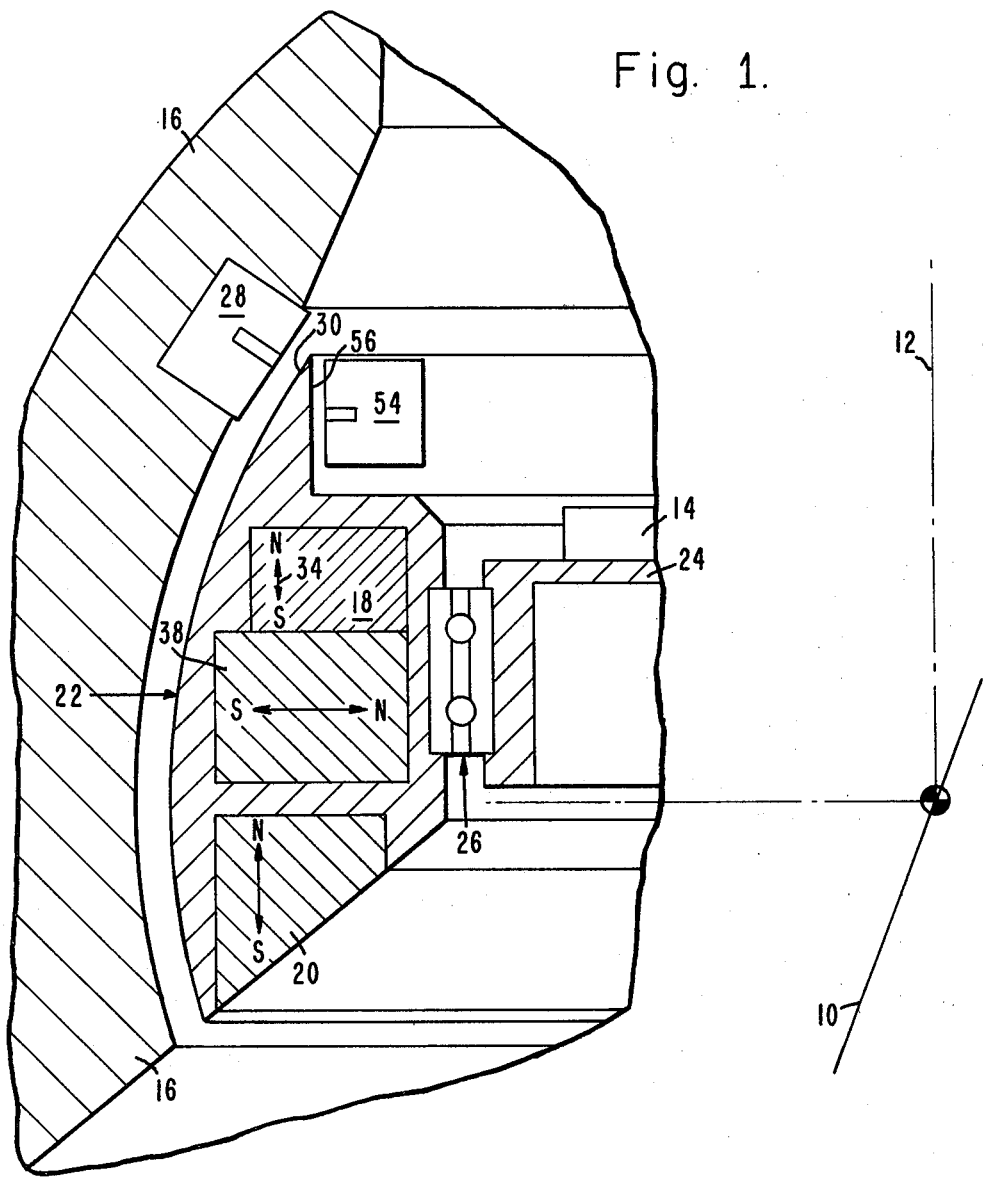
FIG. 1 is a partial cross sectional view of the gyroscope illustrating the configuration of the rotor assembly.

The unique features of the improved gyroscope of the present invention are illustrated in FIG. 1. The missile or other seeker device (not shown) has a longitudinal centerline 10. The gyroscope has a spin axis 12. Prior to launching of a missile, the axes of the gyroscope are aligned with the body axes of the missile. The angular displacement between the spin axis 12 and missile centerline 10 is detected by the angle sensing phtotosensors such as photosensor 28. The photosensor may determine angular displacement (precession) of the rotor assembly 22 by sensing a light and dark pattern around the outside circumference 30 of the rotor assembly. Other equally effective angular displacement sensors could also be used. A pair of such sensors, or two pairs, operating on orthogonal axes detect the position of the rotor assembly 22 and the gyro spin axis 12 with respect to the missile body axes including its centerline 10. Nulling the output of the sensors indicates proper alignment of the gyro axes and missile body axes.

Energy from a target (not shown) penetrates the transparent nose (also not shown) of the missile and impinges upon, and is detected by, the detector/seeker subassembly 14. If the spin axis 12 is not aligned with the target, the detector/seeker subassembly 14 will generate an output signal indicative of the misalignment. That output signal is processed by electronic circuitry to produce a control current which is applied to the precession coils of the coil assembly 16. The coil assembly 16 is fixed with respect to the missile body and does not rotate about spin axis 12. The control current flowing through the precession coils originates from a source means not shown, and interacts with the magnetic field of permanent ring-shaped torque magnets 18 and 20 to cause rotor assembly 22 to precess in an amount and in a direction such as to cause the gyroscope spin axis 12 to become aligned with the target. Since the stable platform 24 is coupled to the rotor assembly through bearing 26, the detector/seeker subassembly 14 mounted on platform 24 will then see the target as being aligned with the gyroscope spin axis 12 and will not generate an output signal. Platform 24 does not rotate about the spin axis 12, but will follow the precession of the rotor assembly 22. Electronic circuitry (not shown) processes the output signal of the detector seeker subassembly 14 to generate control signals for driving servomechanisms which adjust missile control surfaces which cause the missile to track the target according to the predetermined guidance equations. Thus, the missile continually tracks the target.

Because of the configuration of the rotor assembly 22 and coil assembly 16 of the present invention, the precession of the rotor assembly 22 is exceptionally smooth and accurate. The configuration minimizes cross coupling between the motoring coil currents and the resulting precession of the gyroscope, as well as minimizes the motoring effects caused by precession currents. Further, the configuration minimizes any coupling between the two precession axes. This high isolation is achieved by a configuration which permits elimination of the usually required AC servo. In the usual two-axis gyroscope, precession is accomplished by interaction of a precession current with a magnetic field that varies with the rotation of the rotor assembly. This requires an AC servo. In the present configuration, the precession current or currents interact with the magnetic field established by torque magnets 18 and 20 which do not change with rotation of the rotor assembly, and hence no AC servo is required.

Figure 2:
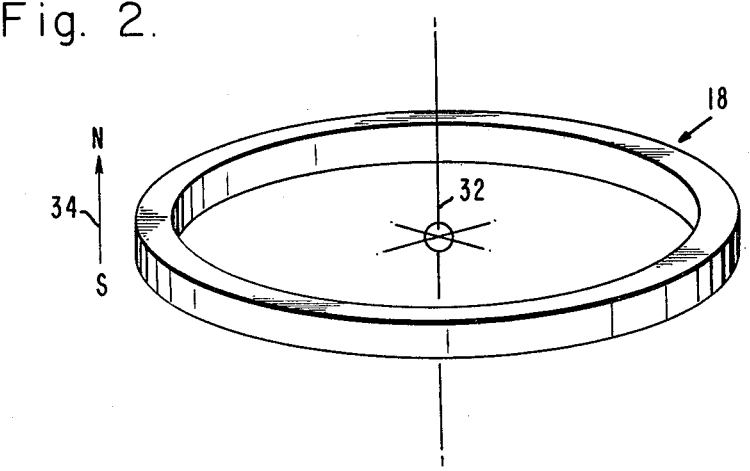
FIG. 2 is a perspective view of one of the torque magnets used to precess the gyroscope.

The ring-shaped permanent torque magnet 18 is best shown in FIG. 2. It is positioned within the rotor assembly 22 with its axis 32 coincident with the gyroscope spin axis 12. The permanent magnetic field of the magnet 18 is oriented as indicated by vector 34, i.e. with the north pole directed toward the nose of the missile. However, the sense of direction of the magnetic vector could be reversed without altering the basic concept of the gyroscope operation. A second ring-shaped permanent torque magnet 20 also has its axis coincident with the spin axis 12 and also has its magnetic field oriented with its north pole toward the nose of the missile. Torque magnet 20 is very much like torque magnet 18 but has a different cross sectional shape as illustrated in FIG. 1.

Torque magnets 18 and 20 are mounted in the rotor assembly 22 in spaced apart axial alignment. Torque magnet 18 is mounted closer to the nose of the missile than is torque magnet 20. Each torque magnet interacts with the circumferential portion of the precession windings (described infra) which are nearest the respective torque magnet. Each precession winding 82, 84, 86 and 88 is somewhat rectangular in shape. (See FIG. 5) Each winding has two opposing axially extending portions and two opposing circumferentially extending portions. One circumferential portion is nearer to the nose of the missile than the other and interacts with torque magnet 18. The other circumferential portion is farther away from the nose and is proximate, and interacts with, the second torque magnet 20. The configuration effects an efficient and symmetric precession of the rotor assembly 22.

Figure 3:
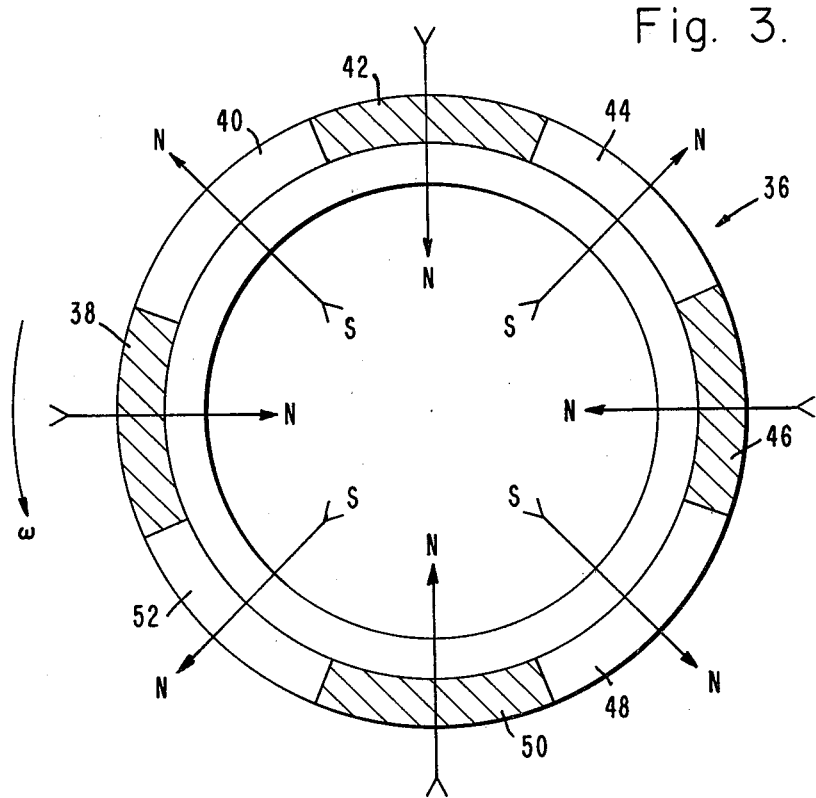
FIG. 3 is a top plan view of the permanent magnets used to motor the gyroscope.

The motor magnet wheel 36 is mounted in the rotor assembly 22 in the space between torque magnets 18 and 20. The motor magnet wheel 36 comprises eight permanent motor magnets 38, 40, 42, 44, 46, 48, 50 and 52 arranged in an annular planar configuration. Each motor magnet has a radially oriented magnetic vector. The polarity of each motor magnet is opposite the polarity of the two adjacent magnets as best shown in FIG. 3. Thus, as the rotor assembly 22 rotates, the magnetic field, presented to the stationary motor coil windings in the coil assembly 16, alternates eight times per revolution.

A portion of the structure of the rotor assembly provides a magnetic return at the inner perimeter of the eight motor magnets. The return reduces the overall reluctance and enhances the usable magnetic field. The return also shunts magnetic flux which would otherwise enter into the volume occupied by the bearing 26. The shunting of flux allows use of a bearing 26 made from standard materials (e.g. 440C or 52100 steels). If the flux were not shunted, the increase in torque on the bearing 26 due to the combination of flux and magnetic steel would be excessive.

Commutation of current through the motoring coils, for interaction with the motor magnets to produce gyro spin, is controlled by photoelectric sensors such as photoelectric sensor 54. The sensor 54 is triggered by a light and dark pattern provided on surface 56 of the rotor assembly 22. The light and dark pattern is keyed to the angular rotational position of the rotor assembly 22. Thus, the output signal of the sensor 54 is processed by electronic circuitry to control the application of current to the motoring coils, of coil assembly 16, in a manner to cause the rotor to spin.

Figure 4:
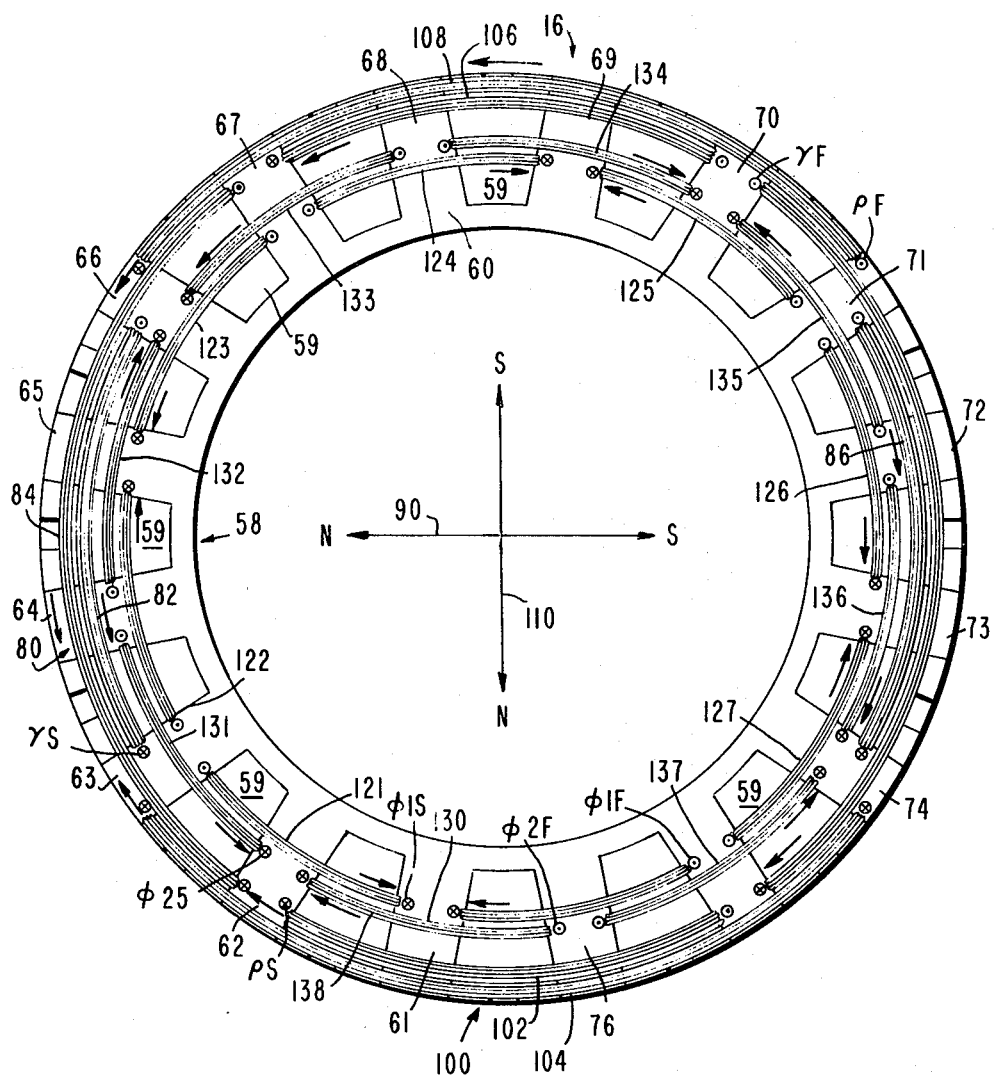
FIG. 4 is a top plan view of the bulkhead and coil assembly, particularly illustrating the placement of the precession coils.

The means for directing current, for interaction with the appropriate magnetic field, is the coil assembly 16. The stator or coil assembly 16 comprises an eight-pole 2 phase motor winding and two separate two-pole windings to produce torque about the pitch and yaw axes respectively. The eight-pole winding is commutated as described above to drive the motor (i.e. spin the gyroscope). Each of the two-pole windings is independently excited with DC to interact with the torque magnets 18 and 20 to precess the gyroscope about the two precession axes. The two-pole precession windings are best illustrated in FIG. 4. The nature of the eight-pole motor windings is best shown with reference to FIG. 4 and FIG. 5. Both the precession windings and motor windings are wound on the same bulkhead 58.

The bulkhead 58 comprises a plurality of spaced non-metallic cores 59 embedded in a resin or epoxy casing 60. The bulkhead is formed by supporting the cores 59 in a jig assembly (not shown). The various windings are then wound onto the cores as described below. After the winding is completed, exterior mold parts are secured in place on the jig assembly surrounding the cores 59 and the windings. A resin or epoxy material is poured into the mold surrounding and encasing the cores 59 and the windings. When the resin has solidified, the mold parts and jig assembly are removed leaving the cores 59 and windings encased in an annular body of resinous material.

Bulkhead 58, comprising the cores 59 held in place in the jig assembly, is provided with a plurality of slots designated 61 through 76 inclusive. The first precession coil 80 comprises four separate windings 82, 84, 86 and 88. The windings are wound upon bulkhead 58 by directing a wire beginning at point $\gamma S$ in through slot 63 and downward, then up through slot 66, then around and down again through slot 63. This is continued until the appropriate number of turns have been wound to form winding 82. The wire is then made to pass into and downward through slot 62, brought around and up through slot 67, then around and back down through slot 62. This is continued until the appropriate number of turns have been wound to form winding 84. As shown in FIG. 4, the direction of winding for each coil is indicated by the direction of the arrow adjacent the individual coil. In a similar manner, winding 86 is formed by winding the appropriate number of turns of wire into slot 74 and upward out of slot 71, and winding 88 is formed by winding the appropriate number of turns of wire into slot 75 and upward out of slot 70 ending at the point $\gamma F$.

A current passing through precession coil 80 will generate a magnetic field indicated by magnetic vector 90. Of course the polarity of vector 90 is easily reversed by applying a current of opposite polarity to precession coil 80. It is the current passing through the circumferential portions of coil 80 which interacts with the constant magnetic fields of torque magnets 18 and 20 to produce precession of the rotor assembly 22 about one of two orthogonal axes.

The second precession coil 100 similarly comprises four separate windings 102, 104, 106 and 108. These windings are formed by directing a wire beginning at point $\rho S$. The wire is directed inward through slot 62 then up and out through slot 75 a sufficient number of times (e.g. 50 times) to form winding 102. The wire then is passed inward through slot 63 then up and out through slot 74 a sufficient number of times to form winding 104. The wire then passes inward through slot 67 then up and out through slot 70 a number of times to form winding 106, then passes in through slot 66 and up and out through slot 71 ending at point $\rho F$ to form winding 108 and complete the second precession coil 100.

A current passing through precession coil 100 will generate a magnetic field indicated by magnetic vector 110. Again, the polarity of vector 110 may be reversed by applying a current of opposite polarity to precession coil 100. The current passing through the circumferential portions of coil 100 interacts with the constant magnetic fields of torque magnets 18 and 20 to produce gyroscope precession about an axis orthogonal to that caused by precession coil 80. From FIG. 4 and the above description, it is apparent that the axis of precession coil 80 is displaced 90 degrees from the axis of precession coil 100. Further, the two coils overlap somewhat at their circumferential extremes although the overlap is not necessary to the basic invention. Thus, a portion of coil 80 occupies the space between slots 66 and 67, as does a portion of coil 100.

The current passing through the axial portions (i.e. directed into or out of the plane of FIG. 4) of precession coils 80 and 100 interacts with the radial flux from the motor magnets to produce lateral force pulses, alternating in direction, eight times per revolution. These force pulses produce side loads on the gimbal and spin bearings but no torque about the spin axis. In order to insure that no torque about the spin axis is produced by this interaction, the number of poles of the rotor must be a multiple of four. If the number is not a multiple of four then a north pole and a south pole would appear 180 degrees apart on the circumference of the motor magnet wheel 36. The north and south poles could interact with the current passing through the axial portion of the precession coils 80 and 100 and produce alternating pulses of torque about the spin axis. Such a result would of course be contrary to the objectives of the invention.

Figure 5:
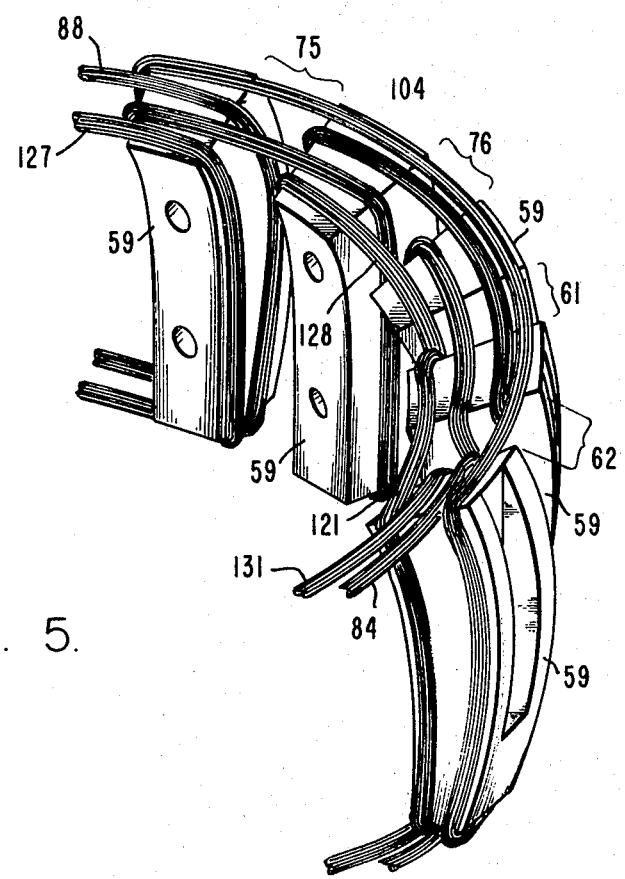
FIG. 5 is a perspective view of a portion of the bulkhead particularly illustrating the placement of the motor coils.

Prior to winding the precession coils 80 and 100 onto the bulkhead 58, the two-phase eight-pole motor windings must be wound onto the bulkhead 58. The configuration of the motor windings is illustrated in FIG. 4 and FIG. 5. The eight windings of the first phase are each displaced 90 electrical degrees (22½ physcial degrees)

from the windings of the second phase. Not all the motor windings are shown in FIG. 5, but only a number sufficient to illustrate the nature of the windings.

The first phase of the motor winding begins at point φ 1S with the wire directed downward (aft) through slot 61 and upward through slot 63 a number of times sufficient to form motor winding 121. After winding 121 is completed the wire is directed downward through slot 65 and upward through slot 63 a number of times sufficient to form motor winding 122. The wire then passes downward through slot 65 and upward through slot 67 a number of times to form motor winding 123. Similarly winding 124, 125, 126, 127 and 128 are formed with the wire finally passing upward out of slot 75 terminating at the point φ 1F.

The second phase of the motor windings begins at point φ2S with the wire directed downward through slot 62 and upward through slot 64 a number of times sufficient to form motor winding 131. The wire then proceeds downward through slot 66 then upward through slot 64 to form motor winding 132. Similarly, motor windings 133, 134, 135, 136, 137 and 138 are each formed 22½ mechanical degrees offset from the corresponding windings of the first phase windings of the motor windings. The winding 138 goes downward into slot 62 and upward out of slot 76 terminating at the point φ2F.

The current flowing through the axial portions of the two phases of the eight-pole motor windings interacts with the radial flux from the eight motor magnets to produce rotor spin torque. The current flowing through the end connections or circumferential portions of the motor windings interacts with the axial flux of the torque magnets to generate a force tending to squeeze the round coil assembly 16 into an octagon, but there is no net component in any one direction.

Phase 1 of the motor coil is excited by an electrical voltage in the form E sin ωt. Phase 2 is excited by a voltage in the form E cos ωt. E represents voltage magnitude and ω is the angular rotor speed. The excitation can also be some form of square wave approximation of the sine and cosine functions.

While the winding pattern for forming the precession coils 80 and 100 and the various motor windings have been described in some detail the description is given only to permit easy verification by the reader that the currents flowing through the specific coils do in fact produce the desired forces in the manner described so as to minimize cross coupling between precession and motoring. The invention should not be interpreted as limited to the specific winding pattern described. Other winding patterns may well produce equivalent currents for causing equivalent precession and motoring in conjunction with the magnetic fields established by the rotor assembly described herein.

The precession coils 80 and 100 have been described as driven by a DC current. This is used as a shorthand description for indicating that if a DC current is passed through the precession coils, a constant precession will result. Of course if the current passing through the precession coils is not DC, the precession of the gyroscope will not be smooth but will follow the drive current passing through the precession coils. Under actual flight conditions the current flowing through the precession coils will not be DC but will be whatever current is required to precess the gyroscope sufficiently to track the target. Because the motor coil currents do not result in cross coupling, i.e. they produce no precession, the precession will smoothly follow the current in the precession coils. Since cross coupling is not dependent upon gimbal angles (there is no cross coupling) the gyroscope can now operate over a broader range of gimbal angles (to about 45 degrees or to any physical stop at a lesser angle) than can gyroscopes of the prior configurations and yet still maintain high accuracy.

While the invention has been described with reference to FIGS. 1 through 5 and the particular embodiment discussed in the specification, such figures and specification are for purposes of illustration and should not be interpreted as limitations upon the invention. Many changes in the details of construction, choice of materials and arrangement of parts will be obvious to one of ordinary skill in the art and all such changes are intended to be included within the spirit and scope of the invention as set forth in the appended claims.

What is claimed is:

1. A two-axis gyroscope comprising:
   a current directing assembly for producing controllable magnetic fields;
   a source means for providing plural currents to said current directing assembly;
   a single rotor assembly of unitary structure rotatable about a spin axis, said rotor assembly comprising:
   first means for providing a first magnetic field characterized by a magnetic vector oriented parallel to said spin axis such that said field remains constant with respect to said current directing assembly as said rotor assembly rotates;
   second means, fixed for rotation with said first means, for providing a plurality of second magnetic fields, each characterized by a magnetic vector orthogonal to said spin axis such that the magnetic field produced by said second means varies with respect to said current directing assembly as said rotor assembly rotates;
   third means, fixed for rotation with said first means, for providing a third magnetic field characterized by a magnetic vector parallel to said spin axis such that said field remains constant with respect to said current directing assembly as said rotor assembly rotates; and
   said second means is located axially between said first and third means, with its central axis coincident with said spin axis;
   said rotor assembly being mounted proximate said current directing assembly, whereby interaction of some of said controllable magnetic fields with said second magnetic fields causes said rotor assembly to rotate about the spin axis and the interaction of others of said controllable magnetic fields with said first magnetic field and said third magnetic field causes said rotor assembly to precess.

2. A gyroscope according to claim 1 wherein:
   said first means and said third means each comprises an annular permanent magnet having its central axis aligned coincident with said spin axis;
   said second means comprises a plurality of permanent magnets oriented to occupy a planar annular space, with the magnetic field of each permanent magnet oriented radially with respect to said spin axis, each with a polarity opposite that of the two adjacent permanent magnets.

3. A gyroscope according to claim 2 wherein:
   the magnetic field of said first means is parallel to said spin axis and points in the same direction as the magnetic field of said third means.

4. A gyroscope according to claim 2 wherein said second means comprises a number of permanent magnets equal to some multiple of 4.

5. A gyroscope according to claim 4 wherein said second means comprises eight such permanent magnets.

6. A gyroscope according to claim 1 wherein said current directing assembly comprises:
- a first current directing means for directing electrical current for interaction with said first and third magnetic fields whereby said rotor assembly may be caused to precess;
- a second current directing means for directing electrical current for interaction with said plurality of second magnetic fields, whereby said rotor assembly may be caused to spin;
- a third current directing means for directing electrical current for interaction with said first and third magnetic fields whereby said rotor assembly may be further caused to precess; and
- said first, second and third current directing means being mounted upon a common member.

7. A gyroscope according to claim 6 wherein:
said first current directing means comprises two coils of wire spaced substantially 180 degrees from one another about the circumference of said current directing assembly, each said coil having a first portion lying proximate a portion of said first means of said rotor assembly and a second portion lying proximate a portion of said third means of said rotor assembly;

said third current directing means comprises two coils of wire spaced substantially 180 degrees from one another about the circumference of said current directing assembly, each said coil having a first portion lying proximate a portion of said first means of said rotor assembly and a second portion lying proximate a portion of said third means of said rotor assembly; and said first current directing means is displaced 90 degrees from said third current directing means about the circumference of said current directing assembly.

8. A gyroscope according to claim 7 wherein said first current directing means and said third current directing means together span substantially the entire circumference of said current directing assembly.

9. A gyroscope according to claim 7 wherein:
said second current directing means comprises a plurality of wire coils evenly placed about the circumference of said current directing assembly, each of said plurality of wire coils having a portion extending substantially perpendicular to the magnetic vectors of said second means of said rotor assembly.

10. A gyroscope according to claim 9 wherein said plurality of wire coils overlap one another.

* * * * *